(No Model.) 2 Sheets—Sheet 1.
G. E. POST.
MOLD AND OPERATING MECHANISM THEREFOR.
No. 544,686. Patented Aug. 20, 1895.
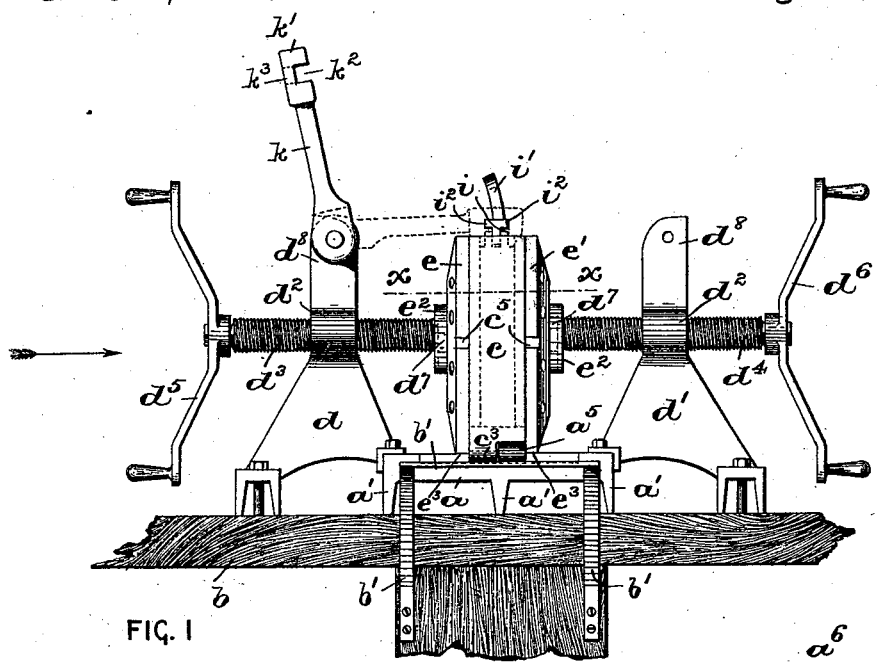
FIG. 1
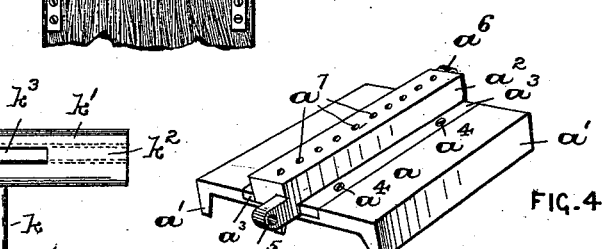
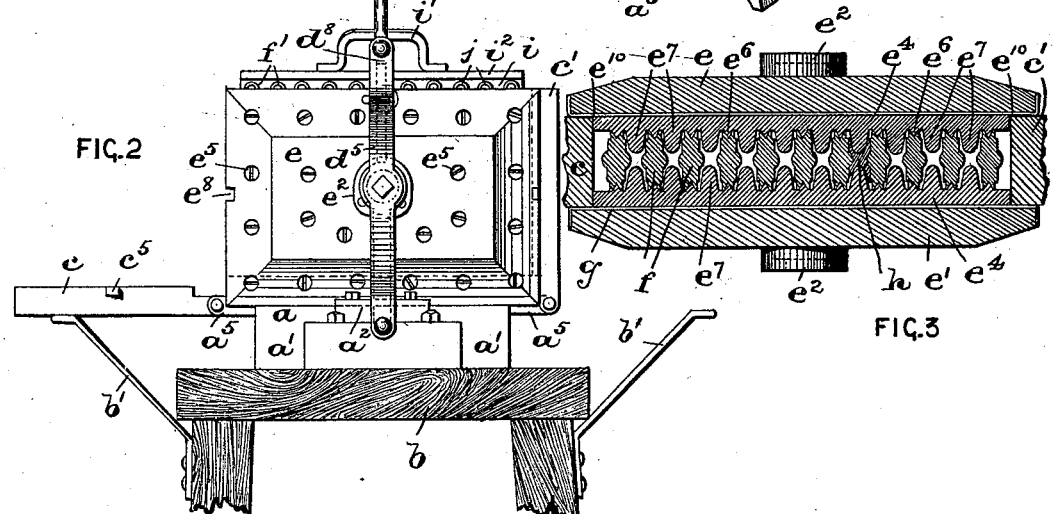
FIG. 2  FIG. 4  FIG. 3
WITNESSES:
Wm. H. Canfield, Jr.
H. S. Marsh
INVENTOR:
GEORGE E. POST.
BY Fred C. Fraentzel, ATT'Y.

(No Model.) 2 Sheets—Sheet 2.
G. E. POST.
MOLD AND OPERATING MECHANISM THEREFOR.
No. 544,686. Patented Aug. 20, 1895.
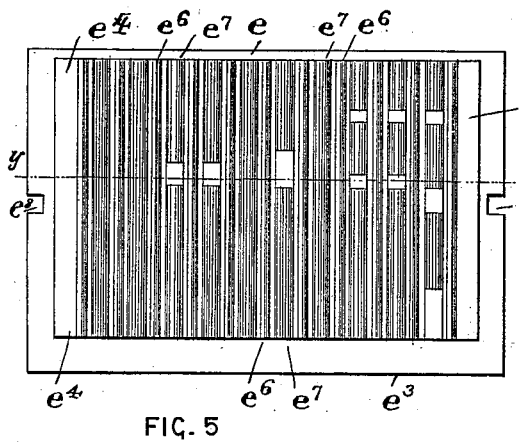
FIG. 5
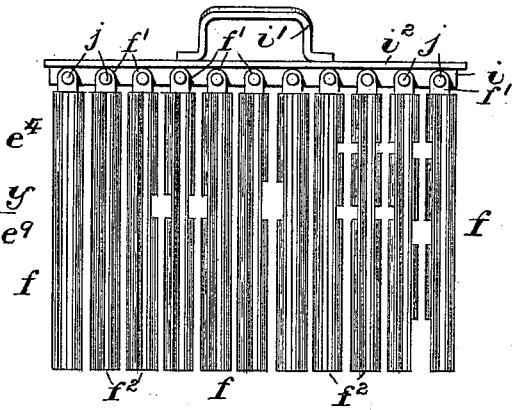
FIG. 7
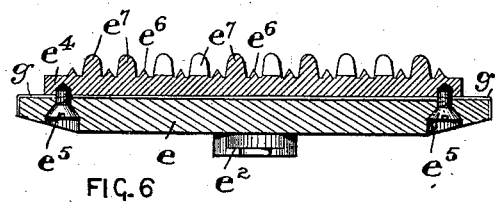
FIG. 6
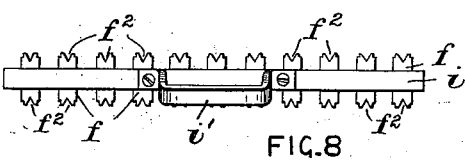
FIG. 8
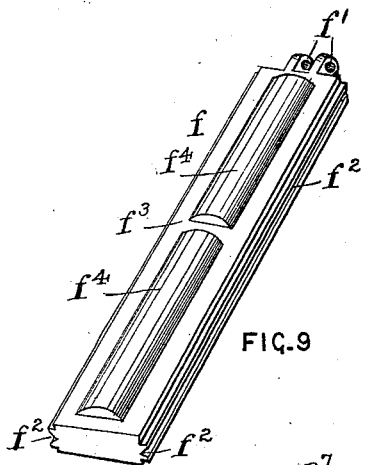
FIG. 9
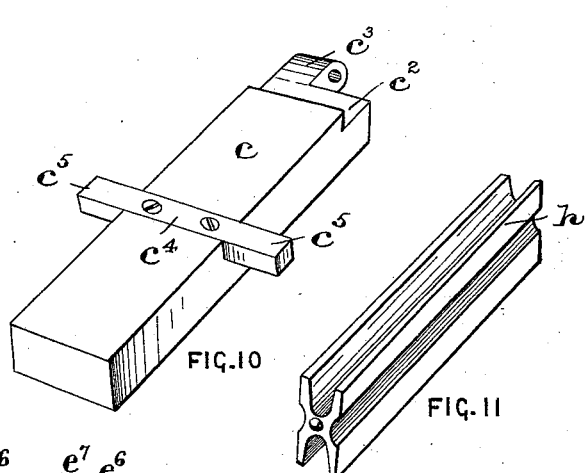
FIG. 10   FIG. 11
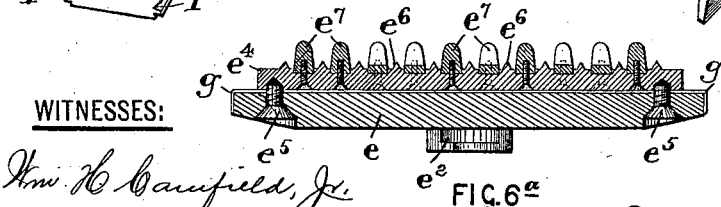
FIG. 6ª
WITNESSES:
Wm. H. Canfield, Jr.
H. W. Marsh
INVENTOR:
GEORGE E. POST.
BY Fred C. Fraentzel, ATT'Y.

UNITED STATES PATENT OFFICE.

GEORGE E. POST, OF NEWARK, NEW JERSEY.

MOLD AND OPERATING MECHANISM THEREFOR.

SPECIFICATION forming part of Letters Patent No. 544,686, dated August 20, 1895.

Application filed December 18, 1894. Serial No. 532,141. (No model.)

*To all whom it may concern:*

Be it known that I, GEORGE E. POST, a citizen of the United States, residing at Newark, in the county of Essex and State of New Jersey, have invented certain new and useful Improvements in Molds and Operating Mechanism Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to a novel form of mold and mechanism connected therewith, in which soft metal, such as stereotype or electrotype metal, is cast into any desired shape; and the invention has for its object, first, the production of a mold for the purpose stated, and, secondly, mechanism to be used in combination with the mold, resulting in a mold of separable parts, which will be durable and which secures a perfect casting of the metal for which the mold is intended.

To these ends the invention consists in the novel form of mold, to be hereinafter fully described, and, further, in the combination, with the mold, of an operating mechanism to be used in connection therewith.

The invention furthermore consists in certain other novel arrangements and combinations of parts, such as will be hereinafter fully described, and finally embodied in the clauses of the claim.

Reference may be had to the accompanying drawings and letters of reference marked thereon, forming part of this specification.

Figure 1 is a front view of my novel form of mold. Fig. 2 is an end view of the same looking in the direction of the arrow in Fig. 1, both views illustrating the complete mold and mechanism for holding the sides of the mold in place. Fig. 3 is a horizontal section of the mold, on an enlarged scale, the section being taken on line $x$ in Fig. 1; and Fig. 4 is a perspective view of the base-plate of the mold and anchor-plate connected therewith. Fig. 5 is a face view of one of the side core-plates of the mold. Fig. 6 is a horizontal section of the same, taken on line $y$ in Fig. 5; and Fig 6$^a$ is a similar view of a core-plate of a slightly-modified form of construction. Fig. 7 is a side view of a top bar and core or depression bars pivotally connected therewith. Fig. 8 is a top view of the same, and Fig. 9 is a perspective view of one of said core or depression bars. Fig. 10 is a perspective view of one of the end plates of the mold. Fig. 11 is a perspective view of one form of casting made in the mold.

In the drawings, $b$ indicates a suitable bed or base, which is preferably made of strong wood in the manner of a table or bench. On said bed is arranged a base $a$ of the mold, which is provided with suitable supports $a'$, and has projecting from its upper surface what I term an "anchor-plate." This plate is designated by the letter $a^2$, and is preferably provided with the flanges $a^3$, being secured by means of screws $a^4$ in a suitable recess or groove in the base, as will be clearly seen from Fig. 4. At each end and to one side of said anchor-plate $a^2$ are perforated ears or lugs $a^5$ and $a^6$, respectively. Pivotally connected with each lug $a^5$ or $a^6$ are suitable end plates $c$ and $c'$, (see Figs. 2 and 3,) each of which is provided with an offset $c^2$ and a perforated end or lug $c^3$, whereby the plates, as has been stated, can be pivotally connected with said anchor-plate and may be turned down to rest on suitable braces $b'$ connected with the table $b$, as will be evident from an inspection of Fig. 2.

As will be seen from Fig. 1, on the opposite sides of the base $a$ are suitable brackets $d$ and $d'$, which are fastened to the bench or table in any well-known manner and are each provided with a screw-threaded hole or opening $d^2$, forming a collar for the oppositely-placed screws $d^3$ and $d^4$, provided with the operating-handles $d^5$ and $d^6$, respectively, which may be removably connected with the ends of said screws, or they may be permanently secured thereon. The opposite end of each screw $d^3$ and $d^4$ is provided with a flanged portion $d^7$, which fits into a chambered plate $e^2$, as indicated in dotted outline in Fig. 1. To each of said plates $e^2$ are secured the side plates $e$ and $e'$ of the mold, the same resting on their lower edges $e^3$, lightly upon the base-plate $a$, and being adapted by means of the screws $d^3$ and $d^4$ to be firmly brought against the sides of the anchor-plate $a^2$, thereby forming a separable mold, as will be clearly evident.

From Figs. 3, 5, and 6 it will be seen that each side plate $e$ and $e'$ is provided with an inner core-plate, as $e^4$, said plates being secured together by screws or rivets $e^5$, or they may be formed integral with each other. Upon the inner surfaces of said plates $e^4$ there are ribs $e^6$, which are V-shaped in cross-section, and other ribs $e^7$, which are of any suitable cross-section, according to the cross-section desired of the metal casting to be formed in the mold. The positions of said ribs $e^6$ and $e^7$ alternate, and when the two plates $e$ and $e'$ are brought in place to form the sides of the mold the V-shaped ribs $e^6$ and the ribs $e^7$ will be opposite one another on their respective plates $e$ and $e'$, as shown. As will be seen from Fig. 6, said ribs $e^7$ may be formed integral with the said plates $e^4$; but in Fig. 6$^a$ I have illustrated a core-plate of a slightly-modified form of construction. In this construction the said core-plate is formed with longitudinally-arranged and parallel grooves in which I arrange bars forming the said ribs $e^7$, and these are securely held in place by means of suitable screws, substantially as shown.

Between the main portion of the plates $e$ and $e'$ and the core-plates $e^4$ I may place a thin piece of sheet metal, as $g$, which acts as a cushion, and owing to its elasticity produces a close and tight fit and thereby produces a perfect seal at the joints of the mold.

When the four sides of the mold have been brought together in place upon the anchor-plate $a^2$, to form the mold-casing, in the manner stated in the above, I place within said casing certain core or depression bars $f$, (see Figs. 3, 7, 8, and 9,) which may be of any desirable cross-section, the form herein shown being only for the sake of illustration, and is used in casting printers' blocks, as $h$. (Illustrated in Fig. 11.) Said core-bars $f$ are provided at the top with perforated ears $f'$, and are pivotally connected by means of pins $j$ to a bar $i$, provided with a handle $i'$ and the flange $i^2$, whereby said bars $f$ can be lifted out or placed in the mold-casing, the said flange $i^2$ being made to rest upon the upper edges of the side pieces and the end pieces forming the mold. The sides of each core-bar $f$ are formed with a V-shaped groove $f^2$, which fit into V-shaped ribs $e^6$ in the side core-plates, and whereby said bars can be slid into position in the mold, forming suitable spaces for pouring the metal into the mold. The sides $f^3$ of the bars $f$ may be left perfectly straight, or they may be provided with projections $f^4$ of any desirable configuration, according to the shape of the casting desired. When the said bars $f$ have thus been placed in position in the mold, their upper portions and the connecting cross-bar $i$ are arranged considerably above the upper edges of the mold, as will be seen from Fig. 2, thereby leaving a sufficient opening on both sides of the mold for pouring the molten metal into the spaces formed by the sides of said bars $f$ and the said ribs $e^7$, and thus dispensing with the use of the usual pouring-gate. After the molten metal has been run into the mold and solidified therein between said core-bars, the castings and said bars can be removed from the mold by means of the handle $i'$, and owing to the pivotal arrangement of the bars on the cross plate or bar $i$ the completed castings can be easily removed and taken out separately by spreading said pivoted core-bars apart, as will be clearly understood from an inspection of Fig. 7.

The end plates $c$ and $c'$ may be provided with a bar $c^4$, (see Fig. 10,) having the projecting ends $c^5$, which fit into cut-away parts $e^8$ and $e^9$ in the plates $e$ and $e'$, while the inner surfaces of said end plates abut against the angular projection formed by said plates $e$ and $e'$ and the core-plates $e^4$, as clearly shown at $e^{10}$ in Fig. 3. After all the parts comprising the complete mold have thus been brought together and the core-bars $f$ have been arranged in position, an arm $k$, pivoted to an extension $d^8$ on either of the said brackets $d$ and $d'$, is brought down upon the top of the plate or bar $i$ on the top of the mold and the device is ready for casting. Said arm $k$ is provided at its free end with a part, as $k'$, extending at a right angle on opposite sides of said arm. It is also provided with a groove $k^2$, which fits over the bar $i$ when said arm $k$ is lowered, as indicated in dotted outline in Fig. 1, while the handle $i^2$ on said bar $i$ passes through a suitable opening $k^3$ in said portion $k'$, substantially as shown. This arm $k$ serves the purpose of retaining the bar $i$ and the core-bars $f$ and the castings formed between them in position between the two end plates $c$ and $c'$ and in front of the side plate $e$, when the plate $e'$ and its core-plate are moved away by means of the screw $d^4$ after the metal in the mold has solidified to prevent injury to the soft-metal castings.

The anchor-plate $a^2$, which forms the base of the mold, may be provided with depressions $a^7$, which form anchor-holes for the molten metal to flow into and form an anchorage for the casting when the side plates $e$ and $e'$ are removed.

The mold is especially adapted for the making of soft-metal castings, such as stereotype or electrotype metal, and for printers' blocks, but may be used for other suitable purposes in the art of casting with soft metal.

As will be evident, either bracket $d$ and $d'$ may be provided with an extension $d^8$, and the arm $k$ can be used on the bracket $d$ or the bracket $d'$.

Having thus described my invention, what I claim is—

1. In a device for casting molten metal, the combination of a mold, comprising therein, a base, having ears $a^5$ on its opposite ends end plates pivoted to said ears, side plates, as $e$ and $e'$, all of said parts being separable, and mechanism co-operating with said sides to form a mold-casing, substantially as and for the purposes set forth.

2. In a device for casting molten metal, the combination, of a mold, comprising therein, a base, as $a$, an anchor plate $a^2$ thereon, end plates $c$ and $c'$ hinged thereto, side plates, as $e$ and $e'$, core plates $e^4$ connected with said plates $e$ and $e'$, all of said parts being separable, mechanism co-operating with said sides to form a mold-casing, and core or depression bars $f$ removably arranged between said plates, substantially as and for the purposes set forth.

3. In a device for casting molten metal, the combination of a mold, comprising therein, a base, as $a$, an anchor plate $a^2$ thereon, end plates $c$ and $c'$ hinged thereto, side plates, as $e$ and $e'$, core plates $e^4$ connected with said plates $e$ and $e'$, all of said parts being separable, mechanism co-operating with said sides to form a mold-casing, a bar $i$, and core or depression bars pivotally connected with said bar $i$, said bar $i$ and said core bars being removably arranged on and in said mold, substantially as and for the purposes set forth.

4. In a device for casting molten metal, the combination of a mold, comprising therein, a base, as $a$, an anchor plate $a^2$ thereon, end plates $c$ and $c'$ hinged thereto, side plates $e$ and $e'$, all of said parts being separable, and mechanism co-operating with said sides to form a mold, consisting essentially, of bearings $d$ and $d'$, screws $d^3$ and $d^4$ working in said bearings, and means for forcing the ends of said screws against the side plates $e$ and $e'$, substantially as and for the purposes set forth.

5. In a device for casting molten metal, the combination of a mold, comprising therein, a base, as $a$, an anchor plate $a^2$ thereon, end plates $c$ and $c'$ hinged thereto, side plates $e$ and $e'$, core plates $e^4$ connected with said plates $e$ and $e'$, all of said parts being separable, and mechanism co-operating with said sides to form a mold, consisting essentially, of bearings $d$ and $d'$, screws $d^3$ and $d^4$ working in said bearings, and means for forcing the ends of said screws against the side plates $e$ and $e'$, substantially as and for the purposes set forth.

6. In a device for casting molten metal, the combination of a mold, comprising therein, a base, as $a$, an anchor plate $a^2$ thereon, end plates $c$ and $c'$ hinged thereto, side plates $e$ and $e'$, core plates $e^4$ connected with said plates $e$ and $e'$, all of said parts being separable, mechanism co-operating with said sides to form a mold, consisting essentially, of bearings $d$ and $d'$, screws $d^3$ and $d^4$ working in said bearings, and means for forcing the ends of said screws against the side plates $e$ and $e'$, a bar $i$, core or depression bars $f$ pivotally connected with said bar $i$, said bar $i$ and said core bars being removably arranged on and in said mold, an arm $k$ pivotally connected with one of said bearings, having a slotted part, as $k'$, adapted to be brought down and over said bar $i$, to hold the same in position, substantially as and for the purposes set forth.

7. The herein described device for casting molten metal, consisting essentially, of a base $a$, an anchor plate $a^2$ thereon, provided with perforated ears $a^5$ and $a^6$, end plates $c$ and $c'$ having perforated ears $c^3$ for pivotally connecting said end plates at the opposite ends of said anchor plate, side plates $e$ and $e'$, and core plates $e^4$ on said side plates, all of said parts forming separable sides of a mold, screw-threaded bearings $d$ and $d'$, screws $d^3$ and $d^4$ in said bearings, provided with handles for forcing the ends of said screws against said side plates $e$ and $e'$ and closing said plates against the end plates $c$ and $c'$, a bar $i$ having a handle $i'$, core or depression bars $f$ pivotally connected with said bar $i$ and said core bars being removably arranged on and in said mold, an arm $k$ pivotally connected with one of said bearings, as $d$, said arm having a plate-like portion $k'$, a groove $k^2$, in said portion $k'$, and an opening $k^3$ in said groove, all of said parts being arranged substantially as and for the purposes set forth.

8. A mold having separable sides, comprising therein, a base plate, end plates $c$ and $c'$ pivotally connected therewith, side core plates $e$ and $e'$ having raised portions, as $e^7$, and V-shaped portions, as $e^6$, means for securing said parts together, and core or depression plates $f$, having guide portions, as $f^2$, whereby said core plates can be made to slide on said V-shaped portions $e^6$, substantially as and for the purposes set forth.

9. In a device for casting molten metal, the combination, of a mold, comprising therein, a base, end plates pivoted thereto, side plates, as $e$ and $e'$, all of said parts being separable, core plates, as $e^4$, connected with said side plates $e$ and $e'$, and thin sheets of metal, as $g$, between said plates $e$ and $e'$ and the core-plates $e^4$ forming a perfect seal, and means for securing said parts together, substantially as and for the purposes set forth.

In testimony that I claim the invention set forth above I have hereunto set my hand this 14th day of December, 1894.

GEORGE E. POST.

Witnesses:
FREDK. C. FRAENTZEL,
WM. H. CAMFIELD, Jr.